(12) United States Patent
Bensussan (10) Patent No.: US 7,413,366 B2
(45) Date of Patent: Aug. 19, 2008

(54) CONNECTING MEMBERS AND METHODS FOR CONNECTING IMPLEMENTS TO EXTENSION POLES

(75) Inventor: Bernard Leon Bensussan, Monroe, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 13 days.

(21) Appl. No.: 10/730,804

(22) Filed: Dec. 9, 2003

(65) Prior Publication Data

US 2005/0123344 A1    Jun. 9, 2005

(51) Int. Cl.
*B25G 3/26* (2006.01)
*B25G 3/18* (2006.01)

(52) U.S. Cl. .................. 403/109.2; 403/18; 403/109.6; 403/324; 403/378; 15/145

(58) Field of Classification Search .......... 285/7; 16/113.1, 429; 15/145; 403/18, 109.1, 109.2, 403/109.3, 109.6, 109.8, 321, 322.1, 324, 403/377, 378, 379.5

See application file for complete search history.

(56) References Cited

U.S. PATENT DOCUMENTS

| | | | |
|---|---|---|---|
| 1,006,427 A | 10/1911 | Boraks | |
| 2,184,881 A | 12/1939 | Martinet | 285/170 |
| 2,546,387 A | 3/1951 | Coffing | 279/79 |
| 2,660,457 A * | 11/1953 | Mallon | 16/429 |
| 2,665,148 A * | 1/1954 | Humphrey et al. | 285/7 |
| 2,755,106 A | 7/1956 | Brennan et al. | 285/7 |
| 2,832,612 A * | 4/1958 | Coutts | 285/7 |
| 2,923,960 A | 2/1960 | Davidson | 15/410 |
| 3,722,927 A | 3/1973 | Miska | 285/317 |
| 3,990,727 A * | 11/1976 | Gallagher | 285/26 |
| 4,247,216 A * | 1/1981 | Pansini | 403/109.3 |
| 4,477,096 A * | 10/1984 | Wallace et al. | |

(Continued)

FOREIGN PATENT DOCUMENTS

DE    92 07 436    9/1992

(Continued)

OTHER PUBLICATIONS

International Search Report for PCT/US04/40340 dated Oct. 31, 2005.

(Continued)

*Primary Examiner*—Daniel P. Stodola
*Assistant Examiner*—Ernesto Garcia
(74) *Attorney, Agent, or Firm*—Ohlandt, Greeley, Ruggiero & Perle, L.L.P.

(57) ABSTRACT

A connecting member for releasably connecting a first part to a second part is provided. The connecting member includes a housing and a first locking member. The housing has a first opening and a second opening. The first locking member has a first tab and a first button. The first locking member is in the housing such that the first locking member biases the first tab through the first opening and the first button through the second opening. The first tab is releasably connectable to the first part over the housing when the first tab is biased through the first opening. Further, the first button remains uncovered by the first part when the first part is releasably connected to the first tab.

4 Claims, 5 Drawing Sheets

U.S. PATENT DOCUMENTS

| | | | | |
|---|---|---|---|---|
| 4,632,436 | A * | 12/1986 | Kimura | 285/305 |
| 4,647,241 | A * | 3/1987 | Weber | 403/18 |
| 4,669,755 | A | 6/1987 | Harris et al. | 285/7 |
| 4,766,638 | A | 8/1988 | McDowell | 15/329 |
| 4,829,857 | A * | 5/1989 | Jones | 16/429 |
| 4,844,512 | A * | 7/1989 | Gahwiler | 285/39 |
| 5,186,341 | A | 2/1993 | Zeid | 211/204 |
| 5,213,376 | A * | 5/1993 | Szabo | 285/39 |
| 5,374,088 | A * | 12/1994 | Moretti et al. | 285/305 |
| 5,412,835 | A | 5/1995 | Vosbikian et al. | 15/257.7 |
| 5,462,380 | A | 10/1995 | Peek et al. | 403/329 |
| 5,604,985 | A | 2/1997 | Andis et al. | 30/132 |
| 5,682,641 | A * | 11/1997 | Newman et al. | 16/429 |
| 5,704,658 | A * | 1/1998 | Tozaki et al. | 285/305 |
| 5,899,481 | A * | 5/1999 | Ferrarin | 403/328 |
| 5,937,473 | A * | 8/1999 | Lisowski | 15/104.05 |
| 5,951,194 | A * | 9/1999 | Faass et al. | 403/256 |
| 6,115,881 | A | 9/2000 | Hult et al. | 15/377 |
| 6,254,305 | B1 * | 7/2001 | Taylor | 16/429 |
| 6,311,368 | B1 * | 11/2001 | Sartori | 16/429 |
| 6,318,764 | B1 * | 11/2001 | Trede et al. | 285/305 |
| 6,370,730 | B1 | 4/2002 | Young et al. | 15/327.1 |
| 6,461,074 | B2 * | 10/2002 | Taylor | 403/109.1 |
| 6,702,332 | B2 | 3/2004 | Young et al. | 285/7 |
| 6,749,227 | B2 * | 6/2004 | Margid | 403/109.3 |
| 6,766,559 | B2 | 7/2004 | Roney et al. | 15/410 |
| 6,886,865 | B2 | 5/2005 | Jung | 285/7 |
| 2002/0042969 | A1 | 4/2002 | Nagai et al. | 15/410 |
| 2005/0050663 | A1 | 3/2005 | Goulet | 15/144.4 |

FOREIGN PATENT DOCUMENTS

| | | | |
|---|---|---|---|
| DE | 4240463 A1 * | 6/1993 | |
| GB | 1566026 A * | 4/1980 | |
| JP | 2005087508 A * | 4/2005 | |
| SU | 679736 * | 8/1979 | |

OTHER PUBLICATIONS

Supplementary European Search Report based on EP Patent Application No. 04 81 2783.1 dated Feb. 14, 2008.

* cited by examiner

CONNECTING MEMBERS AND METHODS FOR CONNECTING IMPLEMENTS TO EXTENSION POLES

BACKGROUND OF THE INVENTION

The present disclosure is related to connecting members. More particularly, the present disclosure is related to connecting members and methods for releasably connecting implements to extension poles.

Extension poles have been used to extend the reach of a variety of tools and implements (hereinafter "implements"). For example, extension poles are used to extend the reach of mop heads, drywall sanding implements, light bulb removing implements, pool skimming attachments, window washing implements, and many others. Typically, the implement and the extension pole are releasably connectable to one another.

Some prior art assemblies have used a threaded connection to releasably connect the implement and the pole. However, the normal use of the assembly can induce a torque sufficient to loosen the threaded connection and, thus, at least partially release the implement from the pole.

Other prior assemblies have used one or more outwardly biased locking tabs positioned on the implement or on the extension pole. When the locking tabs are positioned on the implement, a portion of the implement is positioned in the inner diameter of the extension pole. Here, the locking tabs, when in their outermost position, lock into openings on the extension pole. When the locking tabs are positioned on the extension pole, a portion of the implement is positioned over the outer diameter of the extension pole. Here, the locking tabs, when in their outermost position, lock into openings on the implement. These applications of locking tabs have proven effective at preventing torque related loosening of the implement from the extension pole. Unfortunately, the locking tabs are shielded by the device being locked such that the user can not depress the tab to its innermost position, which makes removal difficult.

Many extension poles are formed from extruded aluminum sheets that are rolled into a cylindrical shape and welded. In order to provide a pleasing aesthetic appearance, the weld line is typically formed in the inner diameter of the extension pole. In the prior devices were the implement is positioned in the inner diameter of the extension pole, the weld line causes one or more problems. For example, the inner diameter of the extension is typically oversized with respect to the implement resulting in a loose connection.

Accordingly, there is a continuing desire for connecting members and methods that alleviate, mitigate, and/or overcome one or more of the deleterious effects and deficiencies of prior art devices.

SUMMARY OF THE INVENTION

It is therefore an object of the present disclosure to provide connecting members that resist loosening due to torque applied during normal use of the device.

It is a further object of the present disclosure to provide connecting members that facilitate easy removal of implements from the extension poles.

It is a still a further object of the present disclosure to provide connecting members that can releasably connect an implement to an outer diameter of an extension pole and, thus, allows the use of either hollow or solid extension poles.

It is another object of the present disclosure to provide low cost, easy to assemble connecting members.

These and other objects are provided by a connecting member for releasably connecting a first part to a second part. In some embodiments of the present disclosure, the connecting member includes a housing and a first locking member. The housing has a first opening and a second opening. The first locking member has a first tab and a first button. The first locking member is in the housing such that the first locking member biases the first tab through the first opening and the first button through the second opening. The first tab is releasably connectable to the first part over the housing when the first tab is biased through the first opening. Further, the first button remains uncovered by the first part when the first part is releasably connected to the first tab.

In other embodiments of the present disclosure, the connecting member includes a housing and a second locking member. The housing has a second opening. The second locking member has a second tab and a second button. The second locking member is on the housing such that the second locking member biases the second tab through the second opening. The second tab is releasably connectable to the second part in the housing when the second tab is biased through the second opening. The second locking member is configured such that pressure on the second button moves the second tab from the second part.

A releasably connected assembly is also provided. The assembly includes a first part, a second part, and a connecting member. The first part has an inner diameter and a first opening. The second part has an outer diameter and a second opening. The connecting member has a first end in the inner diameter and a second end over the outer diameter. The connecting member has a first tab biased through the connecting member at the first end into the first opening and a first button biased through the connecting member such that the first button is freely depressible to move the first tab from the first opening. In addition, the connecting member has a second tab is biased through the connecting member at the second end into the second opening and a second button for moving the second tab from the second opening.

A method of releasably securing an implement to an extension pole is also provided. The method includes inserting a first end of a connecting member into the implement such that a first tab of the connecting member releasably connects the connecting member to the implement and a first button of the connecting member is freely depressibly to release the first tab from the implement; and inserting the extension pole in a second end of the connecting member such that a second tab of the connecting member releasably connects the connecting member to the extension pole and a second button of the connecting member can be depressed to release the second tab from the extension pole.

The above-described and other features and advantages of the present invention will be appreciated and understood by those skilled in the art from the following detailed description, drawings, and appended claims.

DETAILED DESCRIPTION OF THE INVENTION

Figure 1:
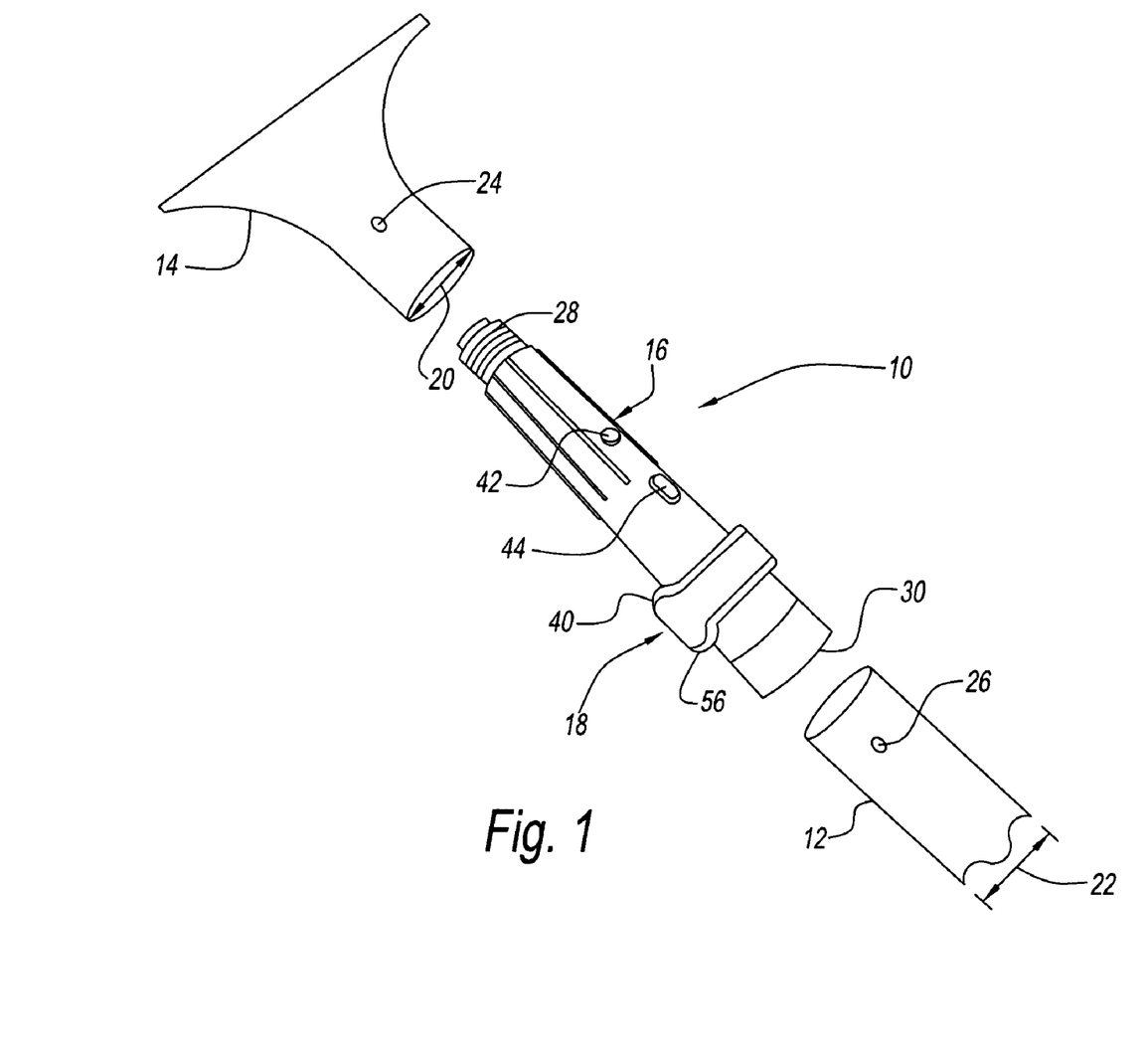
FIG. 1 is a partially exploded perspective view of an exemplary embodiment of connecting member according to the present disclosure in use with an extension pole and an implement.

Referring to the drawings and in particular to FIG. 1, an exemplary embodiment of a connecting member according to the present disclosure is illustrated and generally referred to by reference numeral 10. Connecting member 10 is configured to form an assembly by releasably connecting to one or more parts in such a manner so as to prevent rotation of the parts during use.

Connecting member 10 is illustrated for purposes of example releasably connecting an extension pole 12 and a working implement 14. Connecting member 10 includes a housing member 15 having a first locking member 16 and/or a second locking member 18. In the illustrated embodiment, first locking member 16 can releasably connect connecting member 10 to implement 14, while second locking member 18 can releasably conned the connecting member to extension pole 12. Advantageously, both first and second locking members 16, 18 include a minimum number of components, which are easily assembled, prevent rotation of connecting member 10 with respect to implement 14 and/or extension pole 12, and allow the implement and/or extension pole to be easily removed.

It should be recognized that connecting member 10 is illustrated herein by way of example as separate from extension pole 12 or implement 14. Of course, it is contemplated by the present disclosure for either first locking member 16 or second locking member 18 to be integral with or form a portion of either extension pole 12 or implement 14.

First locking member 16 releasably connects to an inner diameter 20 of implement 14. For purposes of clarity, implement 14 is illustrated as a window squeegee. Of course, it is contemplated by the present disclosure for connecting member 10 to releasably connect any other type of pole mountable working implement such as, but not limited to, mop heads, broom heads, paint rollers, sanding pads, pool skimmers, light bulb removal tools, and others.

Second locking member 18 removably connects to an outer diameter 22 of extension pole 12. Extension pole 12 can be a welded metal tube, as is common in the industry. However, such welded metal tubes typically have a weld line defined within their inner diameter. Alternately, extension pole 12 can be a solid pole formed of wood, plastic, metal, and the like, as is also common in the industry. Again, second locking member 18 removably connects to an outer diameter 22 of extension pole 12. In this manner, connecting member 10 can be used with both hollow and solid extension poles 12. Further, connecting member 10 eliminates wobble between extension pole 12 and implement 14 caused by the weld line of the welded metal poles.

First locking member 16 is configured to be releasably connected to a first opening 24 defined in implement 14. Second locking member 18 is configured to be releasably connected to one or more second openings 26 (only one shown) in pole 12. First locking member 16 includes a first end 28 configured to be received in inner diameter 20 of implement 14. Second locking member 18 has a second end 30 configured to be received over outer diameter 22 of pole 12.

Figure 2:
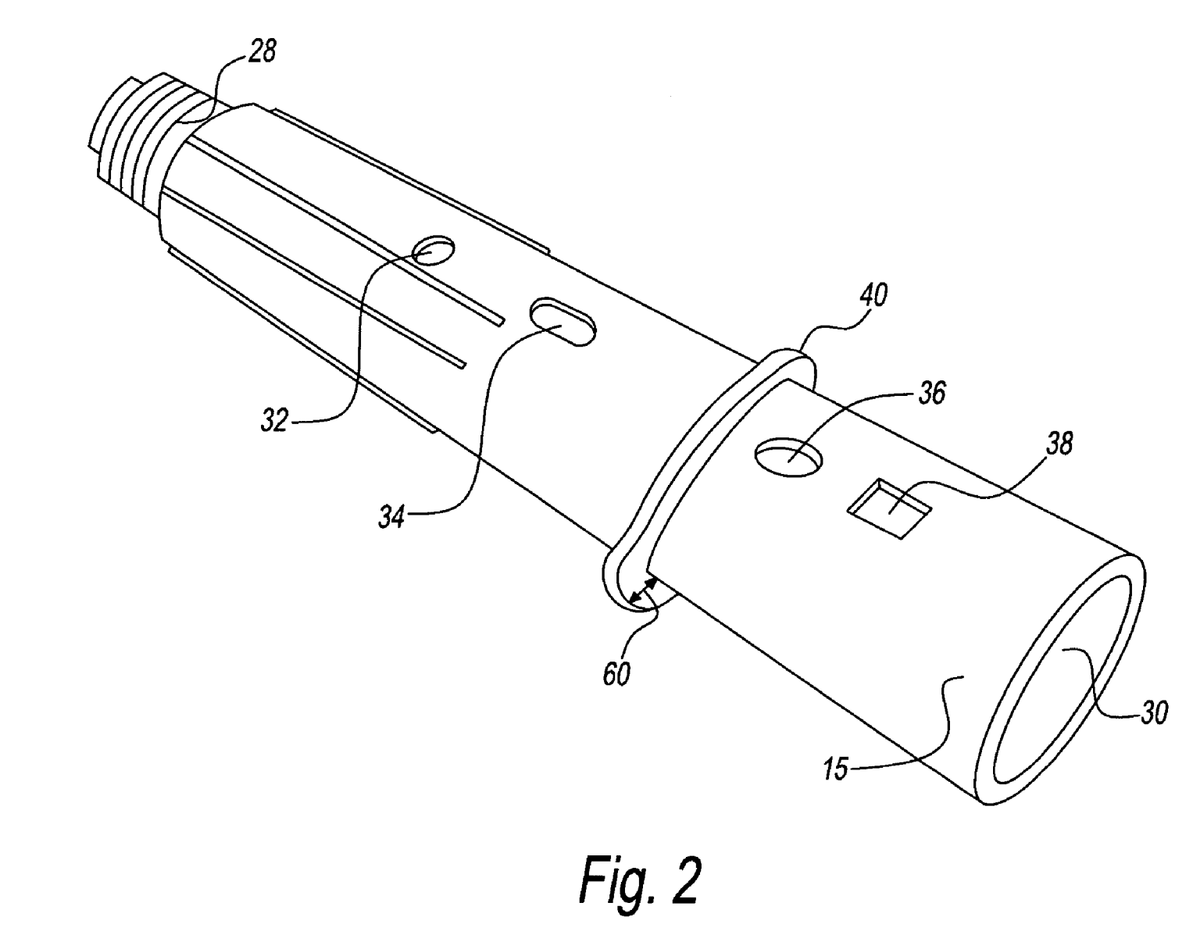
FIG. 2 is a perspective view of a housing of the connecting member of FIG. 1.

Housing 15 is illustrated by way of example having a conical shape, namely increasing in outer diameter from first end 28 to second end 30. Of course, it is contemplated by the present disclosure for housing 15 to have any desired shape configured to be received in implement 14 and/or over pole 12.

Housing 15 has a number of openings 32 through 38. In some embodiments, housing 15 also has an upper retaining rim 40. As is described in detail below, openings 32, 34 form a part of first locking member 16 to releasably connect connecting member 10 to implement 14, while openings 36, 38 and rim 40 form a part of second locking member 18 to releasably connect the connecting member to pole 12.

Figure 3:
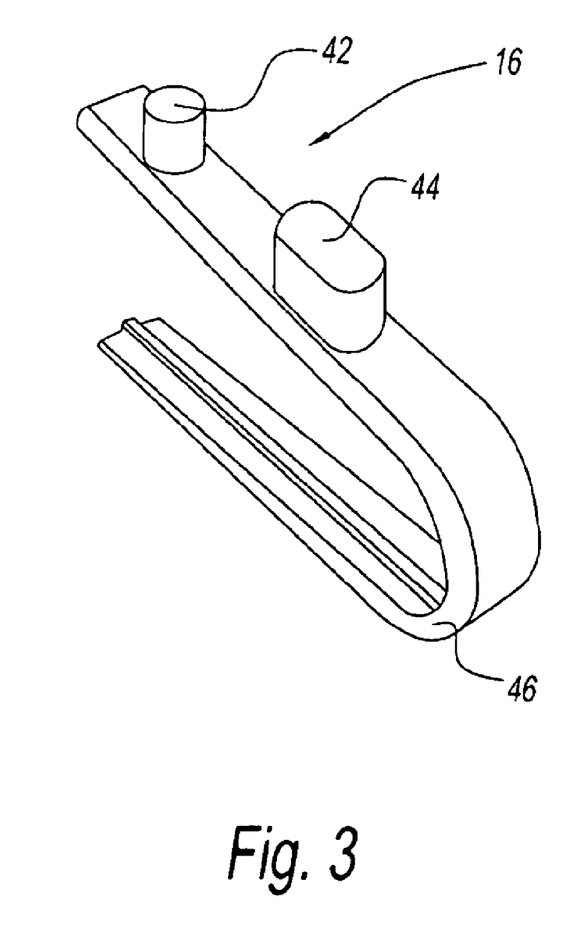
FIG. 3 is a perspective view of a first locking member of the connecting member of FIG. 1.

First locking member 16 has a locking tab 42, a releasing button 44, and a biasing member 46 as illustrated in FIG. 3. It should be recognized that first locking member 16 is illustrated by way of example as a one piece, unitary element. Of course, other configurations having separate components are contemplated by the present disclosure.

First locking member 16 is positioned in connecting member 10 so that locking tab 42 is received in and extend outward from opening 32 as illustrated in FIG. 1. Further, first locking member 16 is positioned in locking member 10 so that releasing button 44 is received in and extends outward from opening 34 as also illustrated in FIG. 1. Biasing member 46 is configured to bias locking tab 42 and releasing button 44 toward openings 32, 34, respectively.

Connecting member 10 can be positioned and aligned in implement 14 so that first end 28 is received in inner diameter 20 and locking tab 42 is in first opening 24. In this position, locking tab 42 is biased by biasing member 46 into, and preferably through at least a portion of first opening 24. Since releasing button 44 is remote from locking tab 42, the button is freely depressible while implement 14 is releasably connected to connecting member 10. Namely, releasing button 44 is not shrouded, shielded, or otherwise covered by implement 14 when locking tab 42 is releasably connected in first opening 24. In the illustrated embodiment, releasing button 44 is shown axially displaced from locking tab 42.

By leaving button 44 uncovered by any portion of implement 14, connecting member 10 can easily be removed from the implement by simply depressing the button 44 to overcome the force of biasing member 46 until tab 42 is clear of first opening 24. Once tab 42 is clear of first opening 24, connecting member 10 can be removed from implement 14. Biasing member 46 imparts sufficient resiliency to first locking member 16 to return locking tab 42 through opening 32 when the pressure applied to button 44 is released.

In some embodiments of the present disclosure, the remote location of button 44 with respect to tab 42 can also provide a leverage advantage in overcoming the biasing force of biasing member 46. In other embodiments of the present disclosure, the height of button 44 with respect to the height of tab 42 can increase the ease with which the tab can be moved clear of first opening 24.

While depressing button 44 may cause tab 42 to become removed from opening 32, the button 44 remains within opening 34. In this manner, connecting member 10 ensures that tab 42 can be easily removed from first opening 24 without causing first locking member 16 to become inadvertently retracted within housing 15. For example, button 44 even when depressed remains at least partially positioned in opening 34 to mitigate instances of first locking member 16 becoming inadvertently retracted within housing 15.

Figure 4:
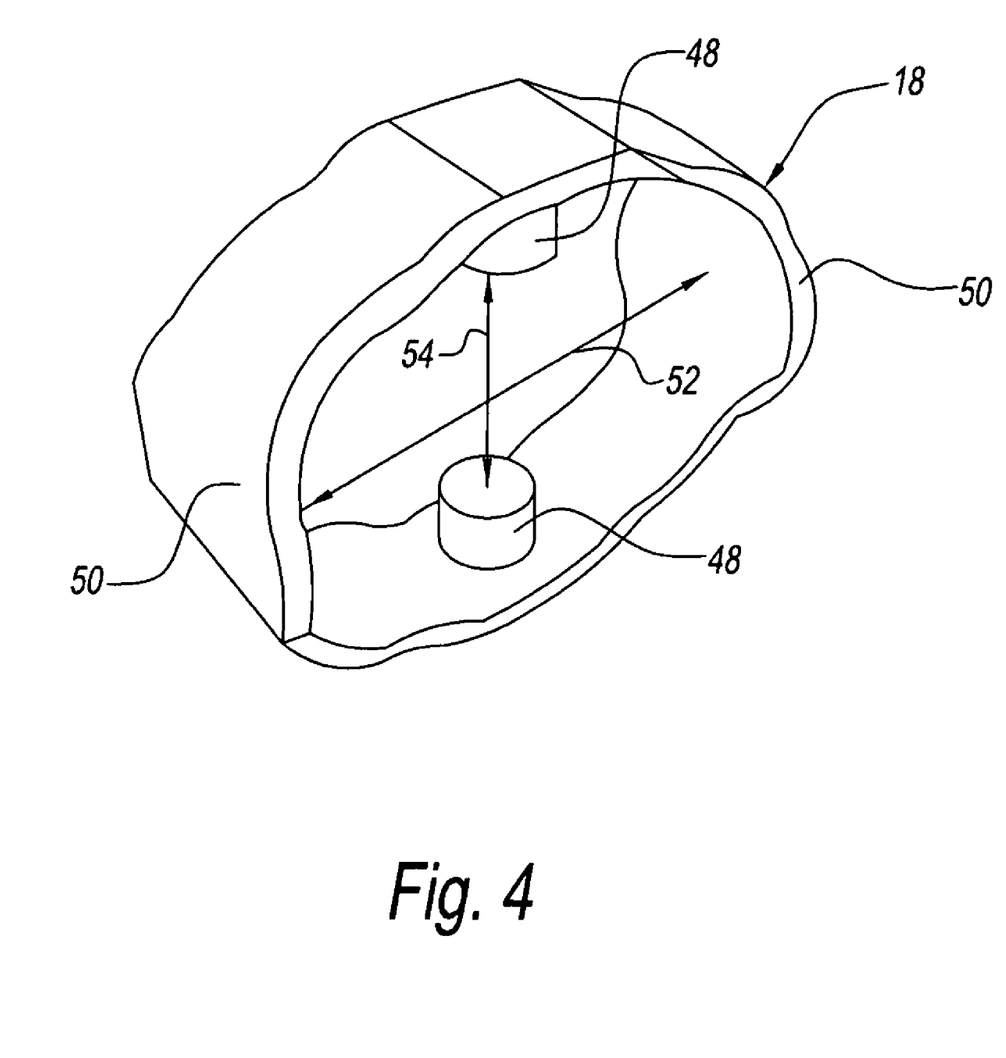
FIG. 4 is a perspective view of a second locking member of the connecting member of FIG. 1.

Second locking member 18 is configured to releasably connect connecting member 10 to pole 12. In an exemplary embodiment, second locking member 18 has one or more second locking tabs 48 and one or more buttons 50 as seen in FIG. 4.

Second locking member 18 is positioned over outer diameter 22 of connecting member 10 so that second locking tabs 48 are received by and extends inward of opening 36 of housing 15 as seen in FIG. 2. Again, only one opening 36 is illustrated for purposes of clarity. Second end 30 of connecting member 10 can be disposed over outer diameter 22 of pole 12 so that the second end is received over the pole and locking tabs 48 are biased into second openings 26 of the pole. In this position, second locking tabs 48 releasably connect connecting member 10 to extension pole 12.

Second locking member 18 has sufficient resiliency to maintain second locking tabs 48 in an inwardly biased position. However, second locking member 18 can be deformed to move second locking tabs 48 outward when pressure is applied to releasing buttons 50. For example, second locking member 18 can have an elliptical shape defining a major axis 52 and a minor axis 54 as seen in FIG. 4. Here, second locking tabs 48 are defined along minor axis 54 and releasing buttons 50 are defined along major axis 54. Second locking member 18 has sufficient resiliency to allow pressure applied at releasing buttons 50 to move locking tabs 48 radially outward to clear second opening 26. Once pressure on releasing buttons 50 is removed, second locking member 18 returns to its original shape. In this manner, connecting member 10 can be releasably connected to pole 12.

It should be recognized that second locking member 18 is described above by way of example having an elliptical shape. Of course, it is contemplated by the present disclosure for second locking member 18 to have any shape that allows pressure applied at releasing buttons 50 to move second locking tabs 48 radially outward to clear second opening 26, yet returns the second locking tabs to their original position when the pressure is released.

In one embodiment, second locking member 18 is maintained in a selected position on housing 15 by upper retaining rim 40. In an alternate embodiment, second locking member 18 is maintained in the selected position by a lower retaining rim 56 illustrated in FIG. 5. In yet another embodiment, second locking member 18 is maintained in the selected position by both the upper and lower retaining rims 40, 56. For example, lower retaining rim 56 can have an inwardly depending tab 58. The lower retaining rim 56 can be positioned over housing 15 such that inwardly depending tab 58 is received in opening 38 in the housing. In this manner, second locking member 18 can be maintained in the selected position by upper and lower retaining rims 40, 56, respectively.

Figure 5:
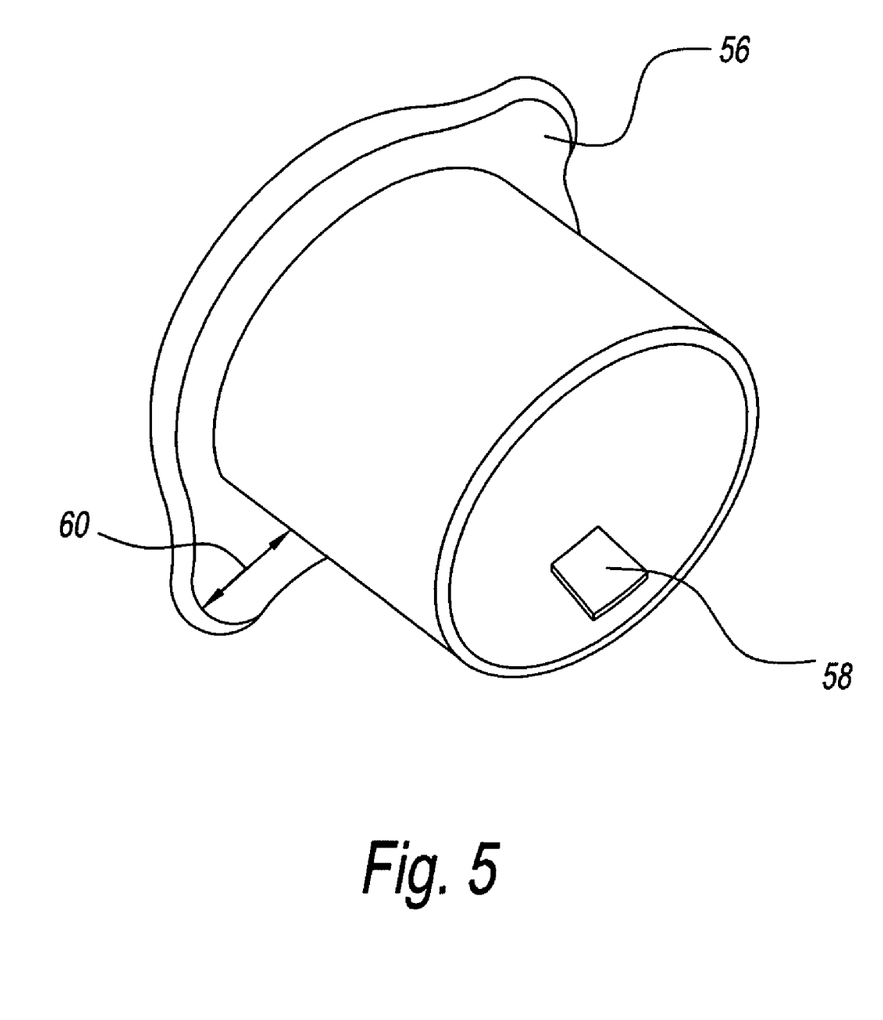
FIG. 5 is a perspective view of a retainer for the second locking member.

In one embodiment, upper and/or lower retaining rims 40, 56 can include a dimension 60 of sufficient height to maintain second locking member 18 in the selected position when second locking tab 48 is biased into second opening 26 and when the tab is moved radially outward to clear the second opening.

It should be recognized that upper and lower retaining rims 40, 56 are illustrated being integral to and releasable connected to connecting member 10 by way of example only. Of course, it should be recognized that one or both of the retaining rims can be integral to connecting member 10, that one or both can be removably connected to the connecting member, that one or both can be permanently connected to the connecting member, and any combinations thereof.

In one embodiment, each component of connecting member 10 is injection molded from a plastic material such as, but not limited to, nylon, delron, POM, actel resins, and others. Of course, it should be recognized that it is contemplated by the present disclosure for connecting member 10 to be formed from other non-plastic materials and/or other non-molding processes.

Advantageously, connecting member 10 can easily and quickly be assembled. For example, connecting member 10 can easily and quickly be assembled by merely inserting first locking member 16 therein and placing second locking member 18 thereon. In some embodiments, second locking member 18 can be maintained in its selected location by interaction of upper and lower retaining rims 40, 56.

In addition, it has been found that the use of locking tabs 42, 48 to secure connecting member 10 to implement 14 and pole 12, respectively, resists loosening caused by torque applied to the connecting member during normal use of the assembly.

Again, it should be recognized that connecting member 10 is described above by way of example only as releasably connecting pole 12 to implement 14. Of course, it is contemplated by the present disclosure for connecting member 10 to releasably connect any first part to any second part.

Further, it is contemplated for connecting member 10 to be integrated directly onto the extension pole or the implement. In this example, connecting member 10 includes only one of the first or the second locking members 16, 18.

For example, first locking member 16 can be positioned in an inner diameter of extension pole 12 so that locking tab 42 extend outward from one opening in the pole and such that releasing button 44 extends outward from a second opening in the pole. Here, inner diameter 20 of implement 14 can be placed over outer diameter 22 of pole 12 so that locking tab 42 is received in first opening 24 in the implement.

In another example, second locking member 18 can be positioned over an outer diameter of implement 14 so that second locking tabs 48 extend inward of opening 24. Here, inner diameter 20 of implement 14 can be placed over outer diameter 22 of pole 12 so that second locking tabs 48 are received in second opening 26 in the pole.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A connecting member for connecting a first part to a second part, the connecting member comprising:
    a housing having a first end and a second end;
    a pair of retaining rims extending from said housing;
    an opening defined in said housing between said pair of retaining rims;
    a locking member having a tab and a button, said locking member disposed about said housing between said pair of retaining rims so that said tab is normally biased through said opening into the second part but so that pressure on said button removes said tab from the second part, wherein said locking member has a major axis and a minor axis, said tab being along said minor axis and said button being along said major axis; and a second locking member having a second button and a second tab, said second locking member being in said housing so that said second button is normally biased through a second opening in said housing and said second tab is normally biased through a third opening in said housing.

2. The connecting member as in claim 1, wherein said locking member prevents rotation of the connecting member with respect to the second part when said tab is normally biased through said opening into the second part.

3. The connecting member as in claim 1, wherein said second locking member prevents rotation of the connecting member with respect to the first part when said second tab is normally biased through said third opening in said housing into the first part.

4. The connecting member as in claim 1, wherein said housing comprises a conical shape that increases in outer diameter from said first end to said second end.

* * * * *